(12) United States Patent
Marchand et al.

(10) Patent No.: US 8,779,375 B2
(45) Date of Patent: Jul. 15, 2014

(54) DEVICE AND METHOD FOR MONITORING A HADRON BEAM

(75) Inventors: Bruno Marchand, Mont-Saint-Guibert (BE); Caterina Brusasco, Bossiere (BE); Sébastien De Neuter, Jandrenouille (BE); Friedrich Friedl, Burgthann/Ezelsdorf (DE)

(73) Assignee: Ion Beam Applications S.A., Louvain-la-Neuve ( * ) Notice: Subject to any disclaimer, the term of this patent is extended or adjusted under 35 U.S.C. 154(b) by 161 days.

(21) Appl. No.: 13/257,882

(22) PCT Filed: Mar. 22, 2010

(86) PCT No.: PCT/EP2010/053726
§ 371 (c)(1),
(2), (4) Date: Jan. 4, 2012

(87) PCT Pub. No.: WO2010/106193
PCT Pub. Date: Sep. 23, 2010

(65) Prior Publication Data
US 2012/0104270 A1    May 3, 2012

(30) Foreign Application Priority Data
Mar. 20, 2009   (EP) .................................... 09155805

(51) Int. Cl.
*G01T 1/185*         (2006.01)
(52) U.S. Cl.
USPC ........................................ 250/389; 250/385.1
(58) Field of Classification Search
USPC .............................................. 250/389, 385.1
See application file for complete search history.

(56) References Cited

U.S. PATENT DOCUMENTS

| | | | | |
|---|---|---|---|---|
| 4,803,368 A | * | 2/1989 | Barthelmes | 250/385.1 |
| 5,672,878 A | * | 9/1997 | Yao | 250/385.1 |
| 6,316,773 B1 | * | 11/2001 | Giakos | 250/394 |
| 7,683,340 B2 | * | 3/2010 | Friedman | 250/385.1 |

(Continued)

FOREIGN PATENT DOCUMENTS

| | | |
|---|---|---|
| EP | 0 040 589 A2 | 11/1981 |
| EP | 1852714 A1 | 7/2007 |

(Continued)

OTHER PUBLICATIONS

Author: Kaori Yajima, Tatsuaki Kanai, Yohsuke Kusano and Takuya Shimojyu, Title: Development of a multi-layer ionization chamber for heavy-ion radiotherapy, Date: Mar. 17, 2009, Publisher: Phys. Med. Biol. 54 (2009) N107-N114.*

(Continued)

*Primary Examiner* — David Porta
*Assistant Examiner* — Taeho Jo
(74) *Attorney, Agent, or Firm* — Fitch, Even, Tabin & Flannery LLP

(57) ABSTRACT

The present invention relates to a device for dosimetry monitoring of a hadron beam, comprising successive ionization chambers obtained by a series of parallel detector plates separated from each other by a gas filled gap, each detector plate having a collecting part comprising a collecting side insulated from a bias voltage part comprising a bias voltage side and arranged in such a way that the collecting side is facing the bias voltage side of a subsequent detector plate, the resulting assembly of these detector plates forming a plurality of ionization chamber cells, the thicknesses and the choice of the materials of each layer constituting each detector plate as well as the gap of an ionization chamber cell have been selected in order to satisfy the condition that the water equivalent thickness of cell is equal to the length of said cell.

14 Claims, 9 Drawing Sheets

(56) References Cited

U.S. PATENT DOCUMENTS

| | | | |
|---|---|---|---|
| 8,044,364 B2 * | 10/2011 | Yamamoto | 250/378 |
| 8,119,978 B2 * | 2/2012 | Islam et al. | 250/252.1 |
| 8,502,133 B2 | 8/2013 | Plompen et al. | |
| 2006/0266951 A1 * | 11/2006 | Fritsch et al. | 250/385.1 |
| 2008/0048125 A1 * | 2/2008 | Navarro | 250/389 |
| 2010/0108901 A1 * | 5/2010 | Prieels et al. | 250/389 |

FOREIGN PATENT DOCUMENTS

| | | |
|---|---|---|
| EP | 1 974 770 A1 | 10/2008 |
| EP | 1974770 A1 * | 10/2008 |
| WO | 2008/154267 A2 | 12/2008 |

OTHER PUBLICATIONS

Author: Masami Torikoshi et al., Title: Irradiation System for HIMAC, Date: Mar. 2007, Publisher: J. Radiat. Res., 48: Suppl., A15-A25 (2007) Irradiation.*

Author: Cirio et al., Title: Two-dimensional and quasi-three-dimensional dosimetry hadron and photon beams with magic cube and pixel ionization chamber, Date: Aug. 2004, Publisher: Institute of physic, phys. Med. Bio.*

R. Cirio et al., "Two-Dimensional and Quasi-Three-Dimensional Dosimetry of Hadron and Photon Beams with the Magic Cube and the Pixel Ionization Chamber." Physics in Medicine and Biology, vol. 49, 2004, pp. 3713-3724.

Kaori Yajima et al., "Development of a Multi-layer Ionization Chamber for Heavy-Ion Radiotherapy." Physics in Medicine and Biology, vol. 54, 2009, pp. N107-N114.

Written Opinion and International Search Report, International Application No. PCT/EP2010/053726, Jul. 15, 2010, 10 pages.

Dmitri Nichiporov et al., "Multichannel Detectors for Profile Measurements in Clinical Proton Fields." Med. Phys., vol. 34, No. 7, Jul. 2007, pp. 2683-2690.

* cited by examiner

Fig. 7 : Pristine Bragg Peak

DEVICE AND METHOD FOR MONITORING A HADRON BEAM

CROSS REFERENCE TO RELATED APPLICATIONS

This application is a national phase application of International Application No. PCT/EP2010/053726, filed Mar. 22, 2010, designating the United States and claiming priority to European Patent Application No. 09155805.6, filed Mar. 20, 2009, which is incorporated by reference herein in its entirety.

TECHNICAL FIELD

The present invention relates to the field of Hadron Therapy, i.e. radiation therapy using strongly interacting particles. More particularly, the invention relates to a device and a method for monitoring a hadron beam.

DESCRIPTION OF RELATED ART

It is well known, nowadays, that hadrons (i.e. neutrons, protons, pions, ions such as carbon ions) have physical advantages with respect to X-rays or gamma rays in the field of radiotherapy. Hadrons and in particular protons of a given energy, i.e. forming a monoenergetic beam, have a defined range and do not penetrate beyond that range. Furthermore, they deposit their maximum value of radiation energy in the so-called Bragg Peak, which corresponds to the point of greatest penetration of the radiation in a target volume being e.g. a tumour to be treated. Since the Bragg peak position depends on the energy of the hadron beam, it is evident that by precisely controlling and modifying the energy one can place the Bragg Peak at a suited depth of a tumour so as to administer the greatest radiation energy to that point and spare, by contrast, surrounding healthy tissue. Moreover, by combining several monoenergetic proton beams of different energies (i.e. performing the range modulation) it is possible to extend the Bragg Peak in order to match the thickness of the tumour and irradiate the tumour with a uniform dose while controlling the dose load on surrounding healthy tissue and critical organs.

Special equipments, such as a modulation wheel, are needed to combine together hadrons of different energies. Furthermore, special equipments are also required to shape the hadron beam in such a way as to match, as much as possible to the shape, size and location of the tumour.

Quality assurance (QA) in radiotherapy generally consists of particular procedures needed to ascertain the consistency and the correctness of medical prescriptions. Such procedures normally relate to the prescribed dose to the target volume to be irradiated and the dose, which should be as small as possible, delivered to the environment of the target volume which usually consists in healthy tissue. Such procedures also relate to minimal exposure of health professionals to irradiation and adequate delivery monitoring. Quality assurance in hadron therapy requires even more stringent procedures with respect to the conventional radiotherapy. Practically, conventional radiotherapy quality assurance procedures are no more sufficient in hadron therapy treatments which require, in particular, full control of beam intensity and energy. For that purpose, suitable dosimetry devices must be provided. Therefore, even if dosimetry in radiotherapy is broadly established, hadron therapy requires new advanced dosimetry devices that should allow measurements of both the absorbed dose in a point as well as 2D and 3D dose distributions.

Such a dosimetry device should have as main features: high sensitivity, small dimensions, fast dynamic response, radiation hardness, no dependence on energy and dose-rate, tissue equivalence, and linear dose response.

Water phantoms are well known in the art and are typically used for establishing the effect of ionizing radiations on human body. Such a water phantom mainly comprises a water tank (with a volume of about 250 liters), and is equipped with driving means for moving a radiation detector (e.g. a water-tight air ion chamber probe, a diode or an array of sensors) within the water tank volume into a plurality of measuring positions. The water tank is filled and emptied by means of a pump control mechanism from an external water reservoir.

Though the use of water phantoms is an established standard since many years, the handling of these large scanning water phantoms is cumbersome and time consuming partly because of the long water tank filling and emptying time.

This main drawback of using water phantoms has been partially reduced using the device disclosed in EP1852714, enabling more often QA test and in a more complete way. The device comprises a water tank, means for varying the water level in the water tank, and a two dimensional acquisition detector positioned in a fixed position with respect to the water tank, the said acquisition detector comprising a plurality of sensors capable of simultaneously measuring a dose in a plurality of points in an area. Said device is also lighter and can be positioned on patient couch, instead of on a special support. Nevertheless, as the stopping range at given energy must be guaranteed, there is still a need to minimize the QA time, in order to increase the frequency of QA tests.

Document U.S. Pat. No. 5,672,878 discloses an ionization chamber which is suitable for monitoring both an electron or photon beam. This ionization chamber mainly comprises a housing having a primary beam passageway and an array of secondary beam cells adjacent to the primary beam passageway. The housing also contains a first array of beam measuring electrodes which provides outputs that are responsive to detection of the radiation intensity of a portion of the electron or photon beam. Also second beam measuring electrodes are contained in the housing in order to provide outputs responsive to the radiation intensity of a second portion of said beam. Nevertheless, this device is only suitable for monitoring geometric characteristics of the radiation beam such as direction and position. Moreover, this device is not capable of monitoring radiation characteristics during the delivery to a target.

Another transmission ion chamber system is described in the document EP0040589. This system is suitable for carrying out a method for measuring and correcting the symmetry and the centering of a radiation beam. This transmission system is located between a collimator and a target to be irradiated, and comprises: four inner collecting electrodes that are fully traversed by said beam; and outer electrodes that are traversed by the beam in a first part of their surfaces, while the remaining parts lie in the shadow of said collimator. However, this system is only suitable for controlling a divergent beam and correcting the centering and symmetry thereof. Further, similarly to the previous one, it is not capable of monitoring radiation characteristics during the delivery to a target.

A well known dosimetry system, suitable for performing fast routine 3D dose verification is the product Magic Cube developed by INFN and University of Torino (Two-dimensional and quasi-three-dimensional dosimetry of hadron and photons beams with the magic cube and the pixel ionization chamber, R. Cirio et. al, Phys. Med. Biol. 49 (2004) 3713-3724). The Magic Cube is a stack of 12 strip-segmented ionization chambers interleaved with water-equivalent slabs of adjustable thickness. Each ionization chamber is defined by two plates with a sensitive area of 24×24 cm². One of the plates, the cathode comprises a 1.5 mm thick machined fibreglass (G10) with a 35 µm copper film on the internal side, while the anode is segmented into 64 strips of 0.375 mm wide and 24 cm long. Each strip is obtained by PCB technique, the non conductive length between two strips being of 100 µm. Each strip is read out individually with custom-designed microelectronic chip. The number and location of water-equivalent slabs can be fixed by the user allowing to the user to choose optimal dose sampling granularity along the beam direction. Simulations with a software have to be performed before the measurement in order to choose the optimal thickness and locations of the tissue equivalent slabs.

Parameters of "scattering" and "range straggling" have also to be taken in consideration. A beam of hadrons traversing the matter interacts with the atoms of matter with many small interactions mainly through the Coulomb force. The effect of those many small interactions is an overall loss of energy of the particles and a deviation from their original direction of motion. As hadrons of a beam undergo many small interactions while traversing the matter, the loss of energy that hadrons have had at a given depth is not exactly the same, but follows a Gaussian statistical distribution.

The term "range straggling" refers to a phenomenon wherein the range of accelerated hadrons traversing a thickness matter follows a Gaussian distribution.

The term "scattering" or "multiple coulomb scattering" refers to a phenomenon wherein the accelerated hadrons traversing a thickness matter are deviated from their original direction of motion, resulting in a broadening of the hadron beam section while traversing the matter.

In the Magic Cube, with the presence of copper layers on almost all the surface of the plates of the ionization chamber cells, an important scattering and range straggling of the beam occurs. Furthermore, as the configuration of the device can change following the beam to be measured, some mechanicals stress on the frame of the chamber may modify the planarity between two electrodes causing an important deviation of the signal. In addition, only 12 points along the axis of the beam may be measured with such a number of ionization chambers which represents a poor spatial resolution.

A tool for measuring depth dose curves in proton and heavy ions beams for Bragg peak analysis is commercially available (Physikalisch Technische Werkstatten GMBH). It comprises a water filled column comprising two bellows which are sealed by 3 mm thickness quartz glass windows. An ionization chamber cell is positioned between the two bellows. The ionization chamber cell is moved between the two bellows by the means of a servo control unit and a linear motor, adjusting a variable thickness of overlaying water. As the position of the measuring detector changes, the bellows are compressed or depressed and water flows from one bellow into the other. Such a device presents a good resolution and can measure a complete depth dose curve in the whole clinical range, but it as is water filed, it weights about 31 kg and it is limited to a 1 dimensional scanning method, thus it remains a time consuming method.

A dosimetry device for online monitoring of a hadron beam generated from a source of radiation and delivered to a target has been disclosed in the document EP1974770. The device comprises a plurality of detector plates arranged in parallel in a face-to-face relation, separated by a gas filled gap, perpendicularly to the central axis of the hadron beam, and forming a plurality of ionization chambers. Each detector plate comprises thin copper layer as collecting or bias voltage electrode and has an opening so as to form an inner cavity for allowing the undisturbed passage of a central portion of the hadron beam delivered to said target and a peripheral region for intercepting and measuring, by means of the plurality of ionization chambers, a peripheral portion of the hadron beam. Such a device refers in particular to ophthalmologic applications, wherein it is known that a hadron beam with energy of 70 MeV is enough for the treatment of cancers of the eye. It is suggested for other application than ophthalmology the use of a tissue equivalent material (e.g. a plastic absorber) between ionization chambers or the variation of the number of ionization chamber for hadron beam of different energy values. But the presence of copper layers in the device causes a scattering and a range straggling of the beam. Accordingly, the device is not water equivalent and corrections on the distances have to be implemented which may be a source of errors. Also, this device only allows monitoring of a passive scattering beam and is not able to monitor of a pencil beam scanning.

Nichiporov et al., in document Med. Phys. 34(7), July 2007, pages 2683-2690, and in patent application WO2008154267, describe a multilayer ionization chamber (MLIC) detector for depth dose profile measurements, containing 122 small-ionization chamber cells stacked at a 1.82 mm step (water-equivalent). Each ionization chamber cell comprises a polystyrene plate having a thickness of 1.5 mm on which is glued on both sides a Mylar film. The outer side of the Mylar film has a graphite central spot painted on it; the inner side, which subsequently is glued to the polystyrene plate, has silver signal lead painted on it. The lead and the central spot are electrically connected by a plated through via in the Mylar film. This structure is repeated on the other side of the polystyrene plate. Each plates are separated from each other with a 1 mm air gap. Detector length is of about 305 mm (122×(1.5 mm+1 mm)) and his water equivalent depth is of about 220 mm (122×1.82 mm). Thus when the device is used to measure a depth profile of a hadron beam having a range of 22 cm in water, the beam has to pass through a physical distance of 30.5 cm in the device. Moreover, this device does not allow measurements of the complete depth dose profile in the whole clinical range (about 37 cm). For high proton range measurement, slabs of various thicknesses according to simulations have to be placed in front of the entrance of the device. The main drawback of this device is that geometrical corrections have to be applied to make corresponding beam ranges values measured by the MLIC with the real beam range traversed in water. This drawback is of particular importance when measuring a hadron therapy beam delivered with well-known energy modulation techniques wherein the SAD (source to axis distance) varies. The SDD (source to detector distance) being an additional geometrical factor that has to be taken into consideration in the geometrical correction for such a device, it may be a source of non-negligible errors when SAD varies with the modulation.

It should be then advantageous to optimize the characteristics of a MLIC device to perform fast and reliable QA measurements of depth dose profile of a hadron beam without the need of SAD dependent corrections.

AIMS OF THE INVENTION

The present invention provides a dosimetry device and a method that do not have the drawbacks of the devices and methods of prior art.

It is a further aim of the present invention to provide a dosimetry device and a method for QA measurements of hadron beams in radiotherapy.

A further aim of the present invention is to provide a dosimetry device and a method for analysis of the dose in dependence of the depth ("the depth dose profile") in a target volume, known as the "Bragg Peak".

In particular, it is a further aim of the present invention our invention to provide a dosimetry device able to perform fast routine measurements with high resolution of Bragg peaks and spread out Bragg peak, for passive as well as dynamic beam delivery, in the whole clinical range (up to 35 cm) without the need to apply geometrical corrections.

It is a further aim of the present invention to realize such a dosimetry device wherein the scattering behaviour of hadrons traversing the materials constituting the device is comparable to the one in a referenced fluid (water)

It is a further aim of the present invention to enable measuring of the enlargement of a hadron beam.

It is further desirable to realize a dosimetry device so stable that it ensures reliability for reproducible constancy check of important beam variables.

Finally it is further desirable to provide a dosimetry device lighter and less cumbersome to setup than the devices of prior art.

SUMMARY OF THE INVENTION

In a first aspect, the present invention relates to a device for dosimetry monitoring of a hadron beam, comprising n successive ionization chambers i obtained by a serie or stack of n+1 parallel detector plates separated from each other by a gas filled gap, each detector plates having a collecting part comprising a collecting side insulated from a bias voltage part comprising a bias voltage side and arranged in a such way that the said collecting side is facing the said bias voltage side of a subsequent detector plate or inversely, each detector plate comprising m layers $L_k$ of materials, the resulting assembly of these detector plates forming a plurality of ionization chamber cells, characterised in that:

the thicknesses $l_k$ and the choice of the materials of each layer $L_k$ constituting each detector plate as well as the gap of an ionization chamber cell i have been selected in order to satisfy the following equation for each ionization chamber i:

$$l_{gi} + \left[\sum_{k=1}^{m} l_k\right]_i \approx \left[\sum_{k=1}^{m} WET_k\right]_i$$

where $l_{gi}$ is the gas filled gap distance between two detector plates (102);

$l_k$ is the thickness of the corresponding layer $L_k$ of a detector plate (102) and;

$WET_k$ is the water equivalent thickness (WET) of the corresponding layer $L_k$ of a detector plate (102).

The sum $$\left[\sum_{k=1}^{m}\right]_i$$

applies for all m layers $L_k$ of a plate for each ionization chamber i.

Preferably, in the context of the present invention, the sign "≈" is meant to have the meaning of "equivalent to" or "essentially equal to". In particular, said sign "≈" means for A≈B, that A=αB, wherein α is comprised between 0.95 and 1.05, preferably between 0.98 and 1.02, more preferably between 0.99 and 1.01, most preferably α is equal to 1.

Typically in use, the hadron beam impinges essentially perpendicularly the stack of plates.

Preferably, in the device according to the invention, m is comprised between 2 and 20, more preferably between 5 and 15, even more preferably between 7 and 11, most preferably m is about 9.

Preferably, in the device according to the invention, n is comprised between 50 and 300, more preferably between 100 and 250, even more preferably between 150 and 200, most preferably between 170 and 190.

Preferably, each of said detector plates comprises a stack of m parallel layers, each layer $L_k$ being made essentially of low atomic number Z materials, Z being preferably inferior to 18.

Preferably, said collecting part and the said bias voltage part of said detector plates are each made of a stack of at least three layers. Preferably, in each stack, a first layer being the external layer is essentially made of graphite, the second and third layers being essentially made of an insulator.

Preferably, said collecting part and said bias voltage part of each detector plate comprise each a fourth layer made of graphite that is adjacent to the corresponding third layer.

Preferably, said collecting part and said bias voltage part of each detector plate of the device comprise each at least, a first layer comprising one or more electrode region, an insulating separation surrounding electrode region and a guard electrode surrounding said insulating separation, a second layer as insulating layer, a third layer comprising at least one conductor track, and;

a fourth layer as guard having at least one insulation path matching with the said conductor tracks of said third layer, the insulation path comprised in the bias voltage side being slightly wider than the said conductor track located in the said third layer of the said bias voltage part, wherein each said conductor track of the said third layer of the said collecting part is connected by a via with each said collecting electrode and the said conductor track of the said third layer of the said bias voltage part is connected by a via with the bias voltage electrode.

Preferably, said detector plates of the device comprise each at least two terminal ears. Preferably, said at least two terminal ears act as means of clamping onto a frame and as means for connecting said collecting side to acquisition means and for connecting the said bias voltage side to a generator.

Preferably, said acquisition means comprises at least one recycling integrator.

Preferably, the device comprises a collimator upstream the first plate exposed to the beam. When comprised upstream the first plate exposed to the beam, the collimator preferably acts as a means for minimizing the irradiation of parts of the device not involved with the direct measurement of the beam.

In a second aspect, the present invention refers to a method for monitoring a hadron beam characterised by the use of a device as described hereinabove, wherein said detector plates are positioned perpendicularly to the central axis of said hadron beam.

Preferably, the method for determining the depth dose profile of a spread out Bragg peak comprises the steps of:
(i) directing a hadron beam having a determined energy,
(ii) measuring the Bragg peak of said hadron beam,
(iii) modifying the energy of said hadron beam,
(iv) repeating steps (i) to (iii) and summing said Bragg peaks for directly obtaining said spread out Bragg peak.

According to one preferred aspect of the method of the invention, (the) measurements are performed by irradiating the device from its front side.

According to another preferred aspect of the method of the invention, (the) measurements are performed by irradiating the device from its back side.

According to still another preferred aspect of the invention, in said method (the) measurements are performed by irradiating the device by both front and back ends (sides).

DETAILED DESCRIPTION OF THE INVENTION

Figure 1:
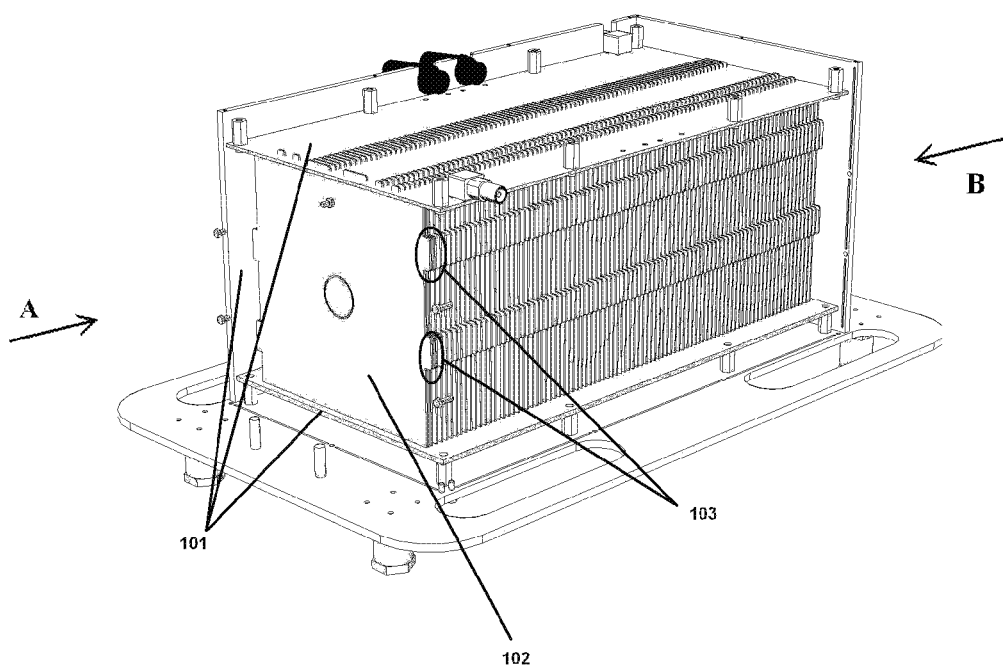
FIG. 1 is a perspective view of the device of present invention.

In a first aspect, the present invention relates to a device for dosimetry monitoring of a hadron beam, comprising n successive ionization chambers i obtained by a serie or stack of n+1 parallel detector plates separated from each other by a gas filled gap, each detector plates having a collecting part comprising a collecting side insulated from a bias voltage part comprising a bias voltage side and arranged in a such way that the said collecting side is facing the said bias voltage side of a subsequent detector plate or inversely, each detector plate comprising m layers of materials, the resulting assembly of these detector plates forming a plurality of ionization chamber cells, characterised in that:

the thicknesses $l_m$ and the choice of the materials of each layer m constituting each detector plate as well as the gap of an ionization chamber cell i have been selected in order to satisfy the following equation for each ionization chamber i:

$$l_{gi} + \left[\sum_m l_m\right]_i \approx \left[\sum_m WET_m\right]_i$$

where
$l_{gi}$ is the gas filled gap distance between two detector plates (102);

$l_m$ is the thickness of the layers m of a detector plate (102) and;

$WET_m$ is the water equivalent thickness (WET) of layer m of a detector plate (102).

Preferably, each of said detector plates comprises a stack of m parallel layers made essentially of low atomic number Z materials, Z being preferably inferior to 18.

Preferably, said collecting part and the said bias voltage part of said detector plates are each made of a stack of at least three layers, the first layers being external layers being made essentially of graphite, the second layers and third layers being essentially made of an insulator.

Preferably, said collecting part and said bias voltage part of each detector plate comprise fourth layers made of graphite that are respectively adjacent to third layers.

Preferably, said collecting part and said bias voltage part of each detector plate of the device comprise each at least,
a first layer comprising one or more electrode region, an insulating separation surrounding electrode region and a guard electrode surrounding said insulating separation,
a second layer as insulating layer,
a third layer comprising at least one conductor track, and;
a fourth layer as guard having at least one insulation path matching with the said conductor tracks of said third layer, the insulation path comprised in the bias voltage side being slightly wider than the said conductor track located in the said third layer of the said bias voltage part,
wherein each said conductor track of the said third layer of the said collecting part is connected by a via with each said collecting electrode and the said conductor track of the said third layer of the said bias voltage part is connected by a via with the bias voltage electrode.

Preferably, said detector plates of the device comprise each at least two terminal ears as means of clamping onto a frame and as means for connecting said collecting side to acquisition means and for connecting the said bias voltage side to a generator.

Preferably, said acquisition means comprises at least one recycling integrator.

Preferably, the device comprises a collimator upstream the first plate exposed to the beam for minimizing the irradiation of parts of the device not involved with the direct measurement of the beam.

In a second aspect, the present invention refers to a method for monitoring a hadron beam characterised by the use of a device as described hereabove, wherein said detector plates are positioned perpendicularly to the central axis of said hadron beam.

Preferably, the method for determining the depth dose profile of a spread out Bragg peak comprises the steps of:
(i) directing a hadron beam having a determined energy,
(ii) measuring the Bragg peak of said hadron beam,
(iii) modifying the energy of said hadron beam,
(iv) repeating steps (i) to (iii) and summing said Bragg peaks for directly obtaining said spread out Bragg peak.

In said method the measurements are performed by irradiating the device by both front and back ends.

The device following the present invention is disclosing in details a water equivalent thickness multilayer ionization chamber (WET MLIC). It is apparent however that a person skilled in the art can imagine several other equivalent embodiments or other ways of executing the present invention, such as a selection of adequate materials or thickness of detector plates to realize other multilayer ionization chamber having an other material than water thickness equivalent.

The term "range straggling" refers to a phenomenon wherein the range of accelerated hadrons traversing a material follows a Gaussian distribution.

The term "scattering" or "multiple coulomb scattering" refers to a phenomenon wherein the accelerated hadrons traversing a matter are deviated from their original direction of motion, resulting in a broadening of the section of the hadron beam while traversing the material.

The term "passive scattering" refers to a mode of beam delivery which involves scattered beams. Passive beam delivery is a method of achieving a spatially uniform dose distribution by scattering and degrading the primary proton beam using a set of distributed absorbers to create the beam diameter, maximum energy, and energy spread needed to deliver uniform dose to the target at all depths.

The term "double scattering" refers to a method of passive scattering wherein the beam is scattered by double scatter foils.

The term "uniform scanning" or "dynamic beam scanning" or "dynamic beam delivery" refers to a time dependent method of achieving a desired dose distribution by magnetically moving the beam across the target cross section while dynamically changing the energy of the beam and, consequently, the depth of penetration.

FIG. 1 represents a perspective view of a dosimetry device for the monitoring of a hadron beam, according to a preferred embodiment of the present invention which comprises a stack of n+1 detector plates (102), two consecutive detector plate being separated by a gas filled gap (104) and forming a plurality of ionization chamber cells.

Each detector plate (102) has on a first side one or more collecting electrodes and on a second side one or more bias voltage electrodes, arranged in such a way that the first side of a detector plate (102) of the device is facing to the second side of subsequent detector plate thereby forming an ionization chamber cell.

Generally, the Water Equivalent Thickness of a portion of material (layer $L_k$) of thickness $l_k$ for a given particle and a given particle energy is defined as the thickness of water $WET_k$ that produces the same energy loss:

$$WET_k = l_k \frac{\rho_k}{\rho_w} \frac{\left(\frac{1}{\rho}\frac{dE}{dx}\right)_k}{\left(\frac{1}{\rho}\frac{dE}{dx}\right)_{water}} \quad \text{(equation 1)}$$

Where:
$\rho_k$ is the material density in g/cm³ in the layer $L_k$
$\rho_w$ is the water density in g/cm³
$l_k$ is the material thickness in cm in the layer $L_k$ $\left(\frac{1}{\rho}\frac{dE}{dx}\right)_k$ is the proton (or another hadron) mass stopping power in the layer $L_k$ in MeV*cm²/g $\left(\frac{1}{\rho}\frac{dE}{dx}\right)_{water}$ is the proton (or another hadron) mass stopping power in water in MeV*cm²/g Preferably, the thicknesses $l_k$ and materials constituting each detector plate (102) and gap of an ionization chamber cell i have been selected in order to satisfy the following equation:

$$l_{gi} + \left[\sum_{k=1}^{m} l_k\right]_i \approx \left[\sum_{k=1}^{m} WET_k\right]_i \quad \text{(equation 2)}$$

wherein for the m layers $L_k$ we have:

$$\left[\sum_{k=1}^{m} l_k\right]_i < \left[\sum_{k=1}^{m} WET_k\right]_i$$

where
- $l_{gi}$ representing the gas filled gap distance between two detector plates,
- $l_k$ representing the thickness of the layer $L_k$ of the detector plate of an ionization chamber cell i, and the sum of all the thicknesses $l_k$ corresponds therefore to the thickness of the given plate.

Also, the choice of materials and geometry of the ionization chamber cells must be such as to insure that the scattering behaviour of the beam is similar to the one in a length of water corresponding to the water equivalent of the cell. The relative dose measured along the stack of ionization chamber cells is the same as measured with a small ionization chamber along a water volume with a length equal to the WET of the stack of cells.

We can also assume for the total of all ionization chamber cells i comprised in the device of present invention:

$$WET_{tot} = \sum_i \left( l_{gi} + \left[\sum_{k=1}^{m} l_k\right]_i \right) \quad \text{(equation 3)}$$

And the characteristic scattering angle at the exit of the stack of plates is roughly the same as the one at the exit of the same length of water.

This equation system means that we have ionization chamber cells in the present invention, wherein the behaviour of an accelerated hadron beam traversing such an ionization chamber cell, is equivalent to the behaviour of the same accelerated hadron beam traversing a thickness of water equal to the length of the said ionization chamber cell.

For example, for an ionization chamber cell formed by a 0.8 mm length gas gap comprised between two detector plates (102) having a WET of 1.2 mm, the behaviour of an accelerated hadron beam traversing one of the said detector plates (102) and the said gas gap will be the same as if the same accelerated hadron beam traverses 2 mm of water.

For the complete device, if we consider, for example, a stack of 180 ionization chamber cells, the hadron behaviour traversing such a device with certain energy, will be the same than in 36 cm of water.

In other words, the length of the range of an accelerated hadron beam in the device is the same than in a thickness of water of the same WET.

Such a dosimetry device may be called then a water equivalent thickness multilayer ionization chamber (WET-MLIC).

Figure 2:
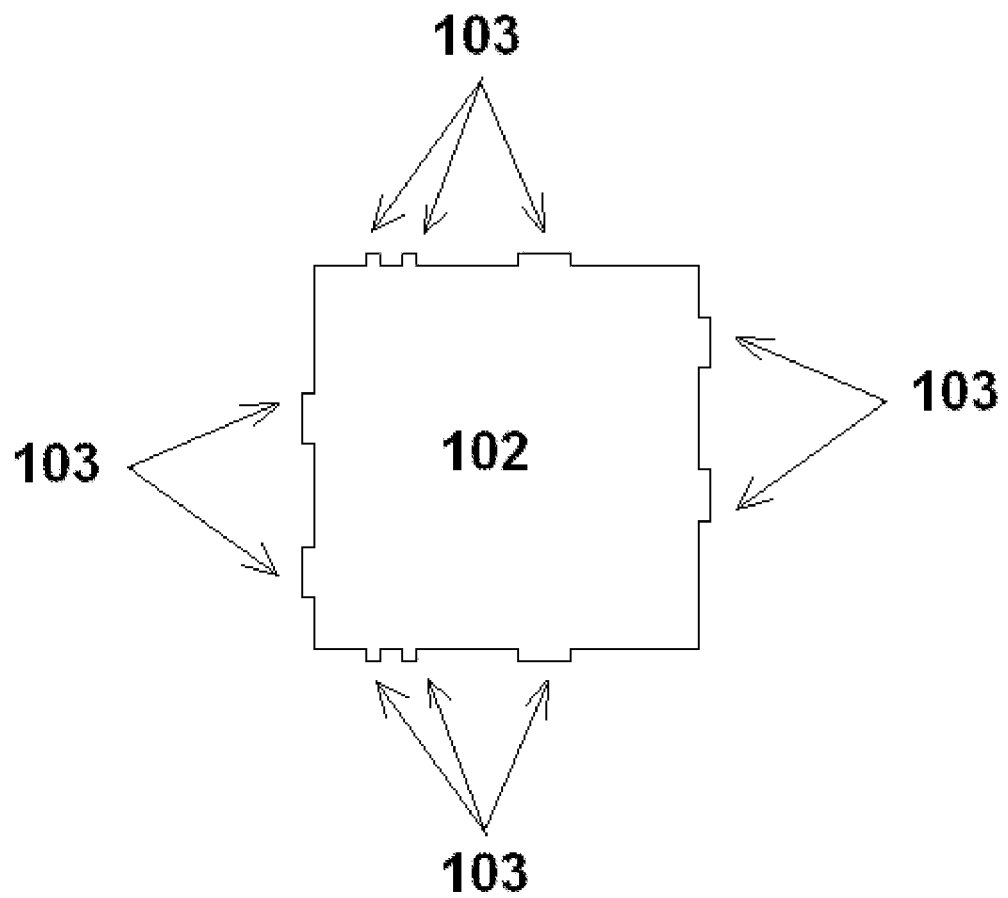
FIG. 2 shows a possible shape for the detector plates of the device of present invention.
Figure 3:
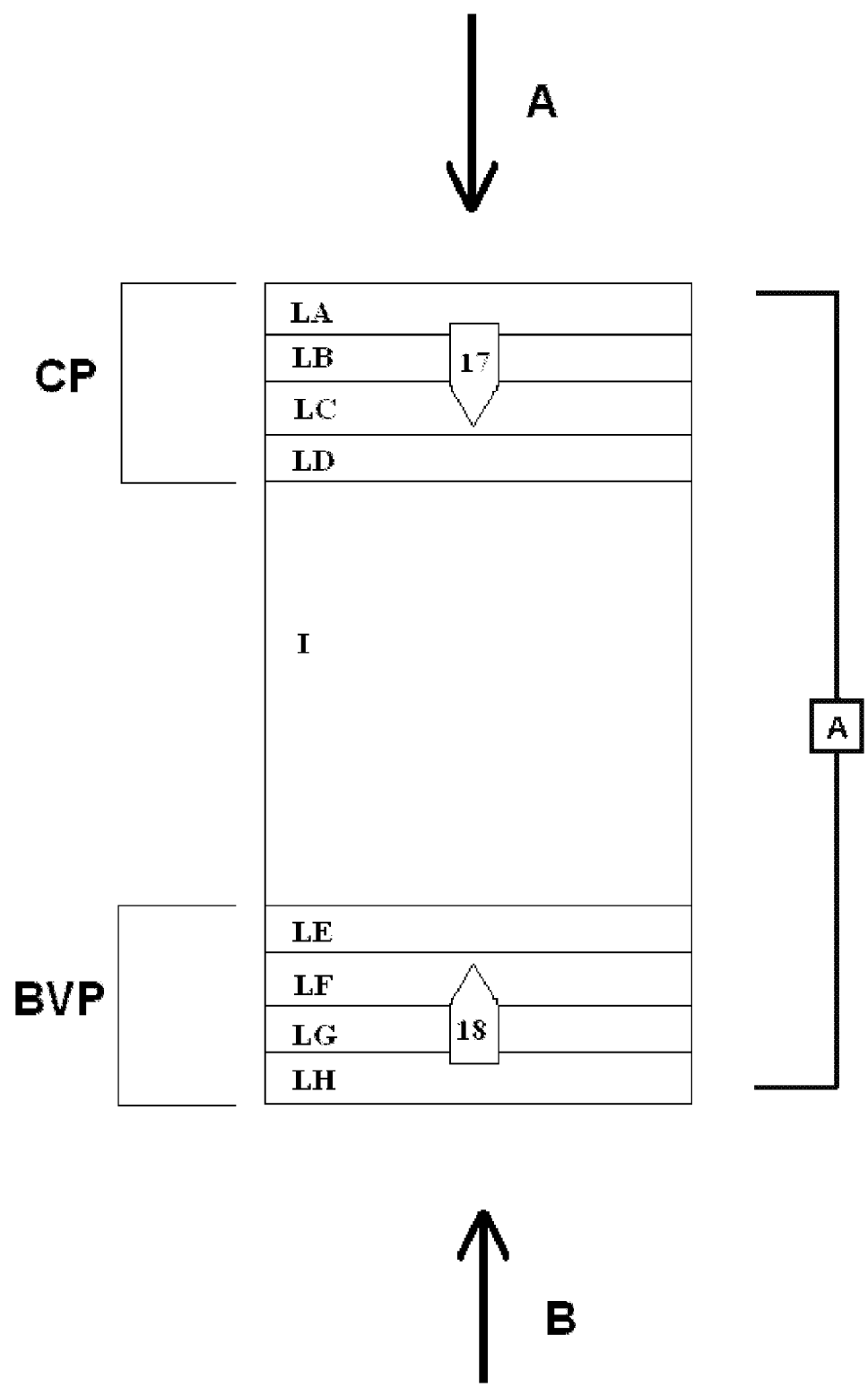
FIG. 3 is an enlarged lateral view showing the different layers of a detector plate as in FIG. 2.
Figure 4:
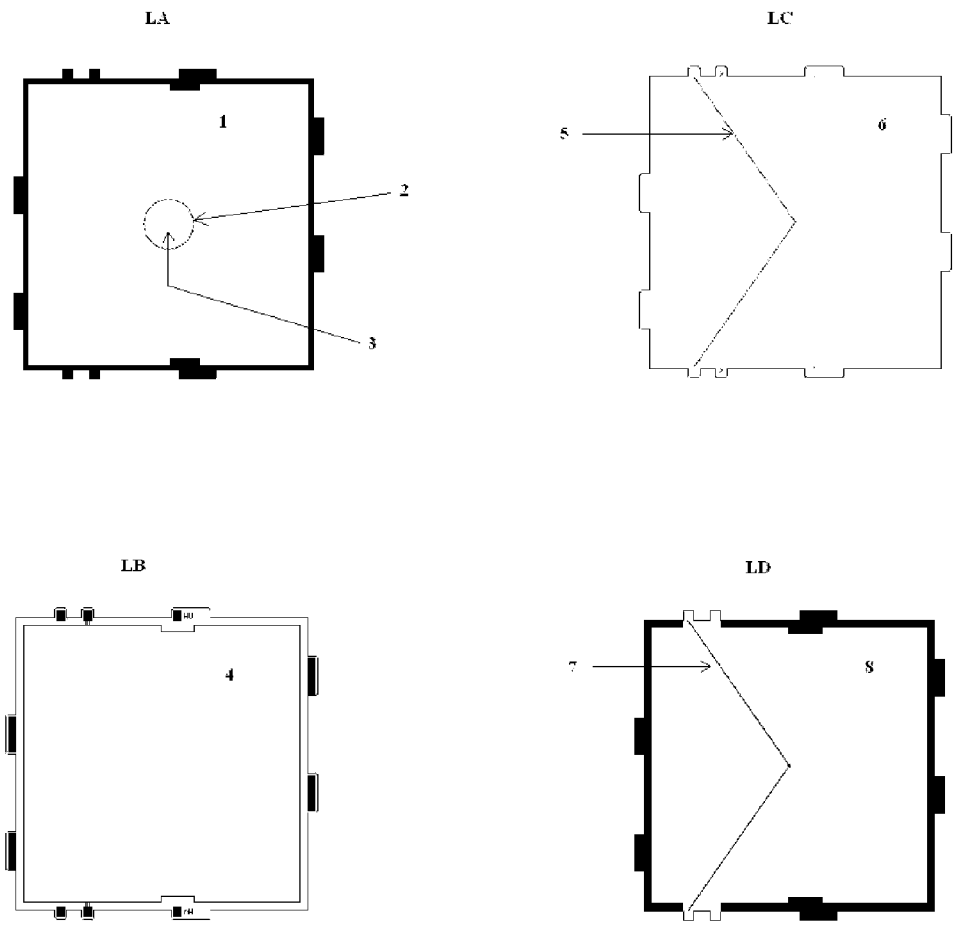
FIG. 4 LA, LB, LC, LD are front views along arrow A of FIG. 1, of the successive layers comprised in the collecting part of a detector plate.

Preferably, each detector plate (102), as represented in FIG. 2, FIG. 3 and FIG. 4, has a planar surface, substantially having a square shape, comprising on the surrounding sides, at least one terminal ear (103) in the continuity of the surface of detector plates, said terminal ear (103) providing preferably a mean of clamping of the detector plates inside one or more support plate (101). Each said support plate (101) is fixed to the frame of the device. Said support plate (101) may be long parallelepiped plates comprising a plurality of drilled thin slits spaced from each other by the same distance and wherein are inserted the detector plates (102). As shown in FIG. 1, detector plates (102) are clamped between four support plates (101) (a lateral support plate has been omitted in the scheme for clarity). This configuration ensures the robustness of the assembly and minimal detector plates positioning errors.

Preferably, some said terminal ear (103) of the said detector plates (102) allow also to provide an electrical contact for connection to multi channel acquisition electrometers and for the bias voltage needed for the proper functioning of each ionization chamber cell.

Preferably, at least one support plate (101) is made in PCB providing clean-looking connections and welding between the terminal ear (103) of detector plates (102) and the multi channel acquisition electrometers and between the detector plates (102) and the bias voltage.

Each detector plates (102) are separated from the other by a gas filled gap having a certain length.

Preferably, this length is identical between all detector plates (102) and has been ideally chosen to form a plurality of ionization chamber cells having a geometrical thickness equal to their water equivalent thickness.

A minimal length of the gap is required in order not to induce a too important beam enlargement in a cell in comparison with beam enlargement in an equivalent cell made of water.

It is also important to specify that we are limited by a critical minimal gap distance according to the sensitivity of the collecting electronics or the error in the definition of the gas gap becomes too large compared to the gas gap itself or under which the design and manufacturing of the electrodes becomes very sensitive to arcing phenomena.

Indeed, a certain gas volume is required inside an ionization chamber cell to have sufficient gas ionization and thus a good reproducibility and quality of the measure.

Preferably, the critical minimal gas gap length equals to about 0.8 mm.

At this distance, a 50 μm positioning error for example generates an error factor of 6.25%.

Figure 5:
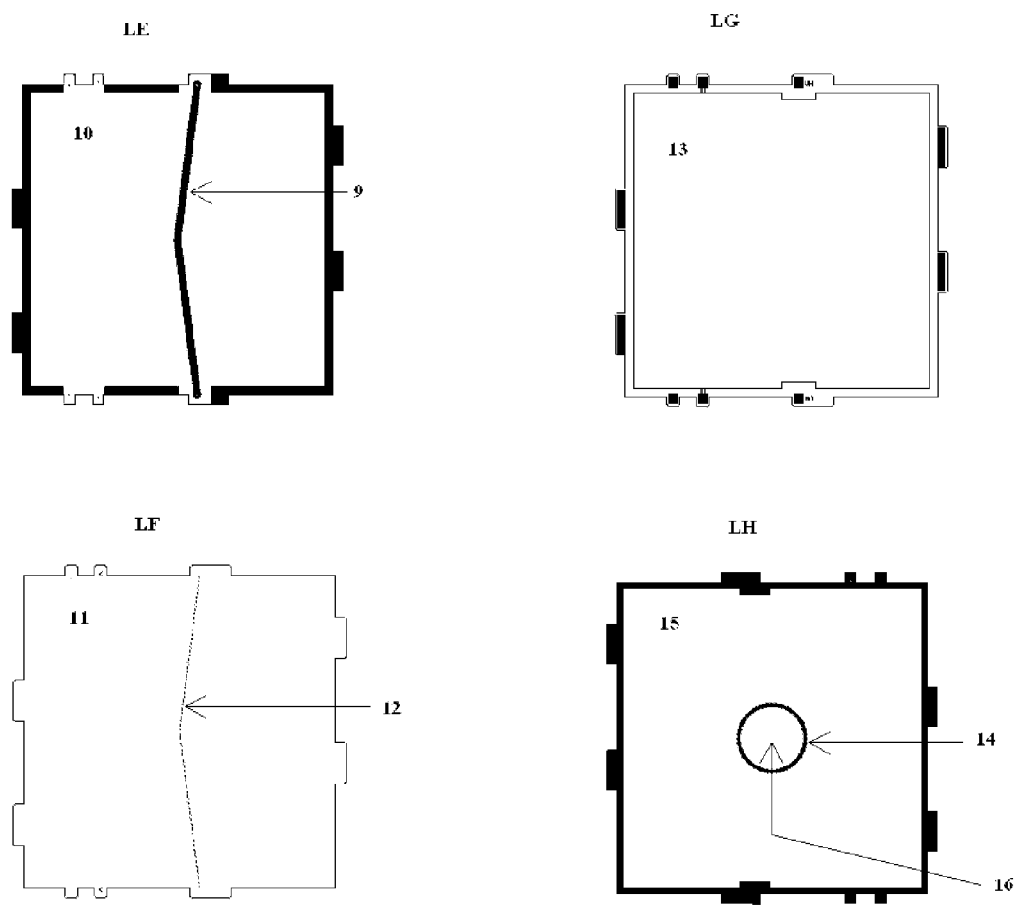
FIG. 5 LE, LF, LG, LH are front views along arrow B of FIG. 1, of the successive layers comprised in the bias voltage part of the detector plate.

An example of detector plate (102) of the present invention is represented in a side view on FIG. 3. Each detector plates is a stack of three main planar parts:
1) a first planar part as the collecting part (CP), comprising at least three layers (LA) to (LC) represented in a planar view on FIG. 4;
2) a second planar part as an insulator layer (I), made of an insulator.
3) A third planar part as the bias voltage part (BVP) comprising at least three layers (LH) to (LF), represented in their planar view on FIG. 5.

Preferably, the insulator layer (I) is made of a widely used epoxy resin, FR4 (Flame Retardant 4).

The collecting part (CP) of the detector plates (102), comprises a first layer of graphite called the collecting side (LA) where a disk shape collecting graphite electrode (3) is separated from a guard graphite electrode (1) by a thin insulating ring (2).

The collecting part (CP) of detector plates comprises further a second layer (LB) in prepreg (4) insulating the first layer (LA) from a third layer (LC) and comprising a "V-shape" track (5) included in a prepreg layer (6).

The "V-shape" track (5) is made of a conductor material, as copper or graphite for examples (non limitative examples).

A via (17) ensure the connection between the disk shape collecting graphite electrode (3) of first layer (LA) to the "V-shape" track (5) of third layer (LC), the said "V-shape" track (5) being connected to an acquisition system.

Advantageously the third layer (LC) is adjacent to a fourth guard (8) layer (LD) comprising a "V-shape" insulation (7) matching with the "V-shape" track (5) of third layer (LC).

The collecting part (CP) is insulated from the bias voltage part (BVP) by a 0.760 mm thick FR4 insulating layer (I).

The bias voltage part (BVP) comprises a first layer also called the bias voltage side (LH) comprising an insulating ring (14) separating a guard electrode (15) located outside the insulating ring from the bias voltage electrode (16) located inside the insulating ring and connected by a via (18) to a "V-shape" track (12) of a third layer (LF) of the bias voltage part (BVP).

The "V-shape" track (12) is made of a conductor material, as copper or graphite for examples (non limitative).

An insulating second layer (LG) made in prepreg (13) separates the third layer (LF) from the first layer (LH) made in graphite.

Advantageously the bias voltage part (BVP) comprises a fourth layer (LE) adjacent to the 0.760 mm thick FR4 insulating layer (I).

Preferably the fourth layer (LE) of the bias voltage part (BVP) comprises a graphite layer as guard layer (10) comprising a "V-shape" insulation (9) slightly wider than a "V-shape" track (12) comprised in the adjacent prepreg (11) third layer (LF), this "V-shape" track (12) being connected to the bias voltage.

Advantageously the width of the said "V-shape" insulation (9) of the fourth layer (LE) is selected to provide a creeping distance avoiding leaking of the charge of the bias voltage to the guard (10) of fourth layer (LE).

Preferably when present in the collecting part (CP) and bias voltage part (BVP) of detector plates (102), the guard layers (LD) and (LE) adjacent to the insulating layer (I) have the function to prevent current from the bias voltage part (BVP) to be collected by the collecting electrode (3) of the same detector plate (102), contributing to the leakage current of the given ionization cell.

The detector plates (102) have been obtained with the widely used PCB technique.

An example of description of the different layers of a plate, all the layers being made essentially of low atomic number Z materials, their thickness, their density, their computed proton mass-stopping power $$\left(\frac{1}{\rho}\frac{dE}{dx}\right)_k$$

at four different given energies and their WET is displayed in table 1a to 1d.

In these examples, the "V-shape" tracks (5) and (12) are made of copper but they might be made of another conductor material as graphite, etc.

Preferably, all layers are essentially made of materials with Z<18.

The same parameters for the gas gap comprised between two subsequent detector plates are displayed for each table together with the sum $$l_{gi} + \left[\sum_{k=1}^{m} l_k\right]_i$$

and the sum $$\left[\sum_{k=1}^{m} WET_k\right]_i.$$

For all the examples, the term $$l_{gi} + \left[\sum_{k=1}^{m} l_k\right]_i$$

from equation (2) and the term $$\left[\sum_{k=1}^{m} WET_k\right]_i$$

for a given cell have been calculated omitting the very thin copper tracks (5) and (12). Indeed, as shown on FIGS. 4 and 5, copper tracks (3) and (13) are not layers, but are thin tracks included in a prepreg layer.

We also neglected the insulating rings (2) and (14) and the "V-shape" insulations (7,9) which can be a vacuum, a polymer or a prepreg path.

For such a choice of materials and thicknesses of the layers of detector plates and for a gas gap of 0.9 mm, equation (2) gives:

$$l_{gi} + \left[\sum_{k=1}^{m} l_k\right]_i \approx 0.2 \text{ cm and, } \left[\sum_{k=1}^{m} WET_k\right]_i \approx 0.2 \text{ cm.}$$

TABLE 1a

Device used for monitoring a 70 MeV proton beam.

| Layer $L_k$ | Components of layer $L_k$ | Material | Thickness $l_k$ (cm) | Density $\rho_k$ (g/cm³) | $-\left(\frac{1}{\rho}\frac{dE}{dx}\right)_k$ (MeV * cm²/g) | $WET_k$ (cm) |
|---|---|---|---|---|---|---|
| LA | 1.3 | Carbon | 0.002 | 2.267 | 8.587 | 4.02E−03 |
|    | 2 | Insulating ring | / | | | |
| LB | 4 | Prepreg | 0.006 | 1.85 | 9.325 | 1.07E−02 |
| LC | 5 | Copper | included in 6 | | | |
|    | 6 | Prepreg | 0.006 | 1.85 | 9.325 | 1.07E−02 |
| LD | 8 | Carbon | 0.002 | 2.267 | 8.578 | 4.02E−03 |
|    | 7 | Insulation | included in 8 | | | |
| I  | I | FR4 | 0.076 | 1.91 | 9.325 | 1.40E−01 |
| LE | 9 | Insulation | included in 10 | | | |
|    | 10 | Carbon | 0.002 | 2.267 | 8.578 | 4.02E−03 |
| LF | 11 | Prepreg | 0.006 | 1.85 | 9.325 | 1.07E−02 |
|    | 12 | Copper | / | | | |
| LG | 13 | Prepreg | 0.006 | 1.85 | 9.325 | 1.07E−02 |
| LH | 14 | Insulating ring | / | | | |
|    | 15.16 | Carbon | 0.002 | 2.267 | 8.578 | 4.02E−03 |
| | | $\sum_{k=1}^{m} l_k$ | 0.108 | | $\left[\sum_{k=1}^{m} WET_k\right]$ | 1.99E−01 |
| Gas gap | Air | air | 0.09 | 0.0012 | 8.392 | 9.36878E−05 |
| | | $l_{gi} + \left[\sum_{k=1}^{m} l_k\right]$ | 0.198 | | | 1.99E−01 |

$$\left(\frac{1}{\rho}\frac{dE}{dx}\right)_{water}$$

70 MeV Proton  (MeV * cm²/g)
9.674

TABLE 1b

Device used for monitoring a 100 Mev proton beam.

| Layer $L_k$ | Components of layer $L_k$ | Material | Thickness $l_k$ (cm) | Density $\rho_k$ (g/cm³) | $-\left(\frac{1}{\rho}\frac{dE}{dx}\right)_k$ (MeV * cm²/g) | $WET_k$ (cm) |
|---|---|---|---|---|---|---|
| LA | 1.3 | Carbon | 0.002 | 2.267 | 6.538 | 4.02E−03 |
|  | 2 | Insulating ring | / |  |  |  |
| LB | 4 | Prepreg | 0.006 | 1.85 | 7.103 | 1.07E−02 |
| LC | 5 | Copper | included in 6 |  |  |  |
|  | 6 | Prepreg | 0.006 | 1.85 | 7.103 | 1.07E−02 |
| LD | 8 | Carbon | 0.002 | 2.267 | 6.538 | 3.06E−03 |
|  | 7 | Insulation | included in 8 |  |  |  |
| I | I | FR4 | 0.076 | 1.91 | 7.103 | 1.40E−01 |
| LE | 9 | Insulation | included in 10 |  |  |  |
|  | 10 | Carbon | 0.002 | 2.267 | 6.538 | 4.02E−03 |
| LF | 11 | Prepreg | 0.006 | 1.85 | 7.103 | 1.07E−02 |
|  | 12 | Copper | / |  |  |  |
| LG | 13 | Prepreg | 0.006 | 1.85 | 7.103 | 1.07E−02 |
| LH | 14 | Insulating ring | / |  |  |  |
|  | 15.16 | Carbon | 0.002 | 2.267 | 6.538 | 4.02E−03 |
|  |  | $\sum_{k=1}^{m} l_k$ | 0.108 |  | $\left[\sum_{k=1}^{m} WET_k\right]$ | 1.98E−01 |
| Gas gap | Air | air | 0.08 | 0.0012 | 6.405 | 8.34075E−05 |
|  |  | $l_{gi} + \left[\sum_{k=1}^{m} l_k\right]$ | 0.198 |  |  | 1.98E−01 |
|  |  |  |  |  | $\left(\frac{1}{\rho}\frac{dE}{dx}\right)_{water}$ |  |
|  |  |  |  | 100 MeV Proton | $\frac{(MeV * cm^2/g)}{7.372}$ |  |

TABLE 1c

Device used for monitoring a 200 MeV proton beam.

| Layer $L_k$ | Components of layer $L_k$ | Material | Thickness $l_k$ (cm) | Density $\rho_k$ (g/cm³) | $-\left(\frac{1}{\rho}\frac{dE}{dx}\right)_k$ (MeV * cm²/g) | $WET_k$ (cm) |
|---|---|---|---|---|---|---|
| LA | 1.3 | Carbon | 0.002 | 2.267 | 4.023 | 4.02E−03 |
|  | 2 | Insulating ring | / |  |  |  |
| LB | 4 | Prepreg | 0.006 | 1.85 | 4.366 | 1.07E−02 |
| LC | 5 | Copper | included in 6 |  |  |  |
|  | 6 | Prepreg | 0.006 | 1.85 | 4.366 | 1.07E−02 |
| LD | 8 | Carbon | 0.002 | 2.267 | 4.023 | 1.89E−03 |
|  | 7 | Insulation | included in 8 |  |  |  |
| I | I | FR4 | 0.076 | 1.91 | 4.366 | 1.40E−01 |
| LE | 9 | Insulation | included in 10 |  |  |  |
|  | 10 | Carbon | 0.002 | 2.267 | 4.023 | 4.02E−03 |
| LF | 11 | Prepreg | 0.006 | 1.85 | 4.366 | 1.07E−02 |
|  | 12 | Copper | / |  |  |  |
| LG | 13 | Prepreg | 0.006 | 1.85 | 4.366 | 1.07E−02 |
| LH | 14 | Insulating ring | / |  |  |  |
|  | 15.16 | Carbon | 0.002 | 2.267 | 4.023 | 4.02E−03 |
|  | Sum 1 | $\sum_{k=1}^{m} l_k$ | 0.108 |  |  | 1.96E−01 |

TABLE 1c-continued

Device used for monitoring a 200 MeV proton beam.

| Layer $L_k$ | Components of layer $L_k$ | Material | Thickness $l_k$ (cm) | Density $\rho_k$ (g/cm³) | $-\left(\frac{1}{\rho}\frac{dE}{dx}\right)_k$ (MeV * cm²/g) | $WET_k$ (cm) |
|---|---|---|---|---|---|---|
| | | air | 0.09 | 0.0012 | 3.953 | 9.40776E−05 |
| | | $l_{gi} + \left[\sum_{k=1}^{m} l_k\right]_i$ | 0.198 | | $\left[\sum_{k=1}^{m} WET_k\right]$ | 1.96E−01 |
| | | | | | $\left(\frac{1}{\rho}\frac{dE}{dx}\right)_{water}$ | |
| | | | | 200 MeV Proton | (MeV * cm²/g) 4.538 | |

TABLE 1d

Device used for monitoring a 230 Mev proton beam.

| Layer $L_k$ | Components of layer $L_k$ | Material | Thickness $l_k$ (cm) | Density $\rho_k$ (g/cm³) | $-\left(\frac{1}{\rho}\frac{dE}{dx}\right)_k$ (MeV * cm²/g) | $WET_k$ (cm) |
|---|---|---|---|---|---|---|
| LA | 1.3 | Carbon | 0.002 | 2.267 | 3.686 | 4.02E−03 |
| | 2 | Insulating ring | / | | | |
| LB | 4 | Prepreg | 0.006 | 1.85 | 4 | 1.07E−02 |
| LC | 5 | Copper | included in 6 | | | |
| | 6 | Prepreg | 0.006 | 1.85 | 4 | 1.07E−02 |
| LD | 8 | Carbon | 0.002 | 2.267 | 3.686 | 1.73E−03 |
| | 7 | Insulation | included in 8 | | | |
| I | I | FR4 | 0.076 | 1.91 | 4 | 1.40E−01 |
| LE | 9 | Insulation | included in 10 | | | |
| | 10 | Carbon | 0.002 | 2.267 | 3.686 | 4.02E−03 |
| LF | 11 | Prepreg | 0.006 | 1.85 | 4 | 1.07E−02 |
| | 12 | Copper | / | | | |
| LG | 13 | Prepreg | 0.006 | 1.85 | 4 | 1.07E−02 |
| LH | 14 | Insulating ring | / | | | |
| | 15.16 | Carbon | 0.002 | 2.267 | 3.686 | 4.02E−03 |
| | Sum 1 | | 0.108 | | | 1.96E−01 |
| Gas gap | Air | air | 0.08 | 0.0012 | 3.624 | 8.36509E−05 |
| | | $l_{gi} + \left[\sum_{k=1}^{m} l_k\right]_i$ | 0.198 | | $\left[\sum_{k=1}^{m} WET_k\right]$ | 1.96E−01 |
| | | | | | $\left(\frac{1}{\rho}\frac{dE}{dx}\right)_{water}$ | |
| | | | | 230 MeV Proton | (MeV * cm²/g) 4.159 | |

When the device is traversed by a proton beam having an energy in a range comprised between 70 and 230 MeV (i.e. the usual proton beam energy employed in proton therapy), the right hand of equation (2) (i.e. the sum of the WET's for a plate) remain nearly constant, i.e. between 0.199 and 0.196 cm. Therefore, equation 2 is satisfied within this range, and $l_{gi}$ is selected such that $l_{gi} + \left[\sum_{k=1}^{m} l_k\right]_i$ is within this range.

The choice of materials with low Z for the ionization chamber plates (and minimizing the impact of the copper tracks along the beam) ensures a scattering behaviour similar to the one in water. The previous device disclosed by the applicant in patent application EP 1974770 does not present the characteristics of the invention because each plate is separated by an air gas gap of 1.5 mm and each plate comprises two copper layers of 35 micrometer and a FR4 layer of 0.5 mm.

Table 1e is representing for several layers of a plate, as well as for the air gap comprised between two subsequent plates, the thickness, the density, the computed proton mass-stopping power $$\left(\frac{1}{\rho}\frac{dE}{dx}\right)_k$$

at 200 MeV, the $WET_k$ value, and the sum $$l_g + \left[\sum_{k=1}^{m} l_k\right].$$

TABLE 1e

| Material | Thickness $l_k$ (cm) | Density $\rho k$ (g/cm$^3$) | (1/r*dE/dX) (Mev*cm$^2$/g) | $WET_k$ (cm) |
|---|---|---|---|---|
| Copper | 0.0035 | 8.92 | 3.033 | 2.09E−02 |
| FR4 | 0.05 | 1.85 | 4.366 | 8.90E−02 |
| Copper | 0.0035 | 8.92 | 3.033 | 2.09E−02 |
| Sum 1 | 0.057 | 0.0012 | 3.953 | 1.31E−01 |
| air | 0.15 | | | 0.000156796 |
| Sum 1 + air | 0.264 | | | 1.31E−01 |

As we can see, in that case, equation (2) is not verified for the example described in EP 1974770.

Preferably, the atomic number Z is inferior to 18.

For example, when the device according to the present invention comprises 180 detector plates (102) or in other words, for a device comprising 180 ionization chamber cells, the maximum detectable water equivalent range is 35 cm.

Additionally, some minor correction factors can be introduced in order to adjust the geometrical equivalence due to an inevitable mechanical tolerance that is reflected on the effective WET of the plates.

When the dosimetry device, according to the invention is traversed by a hadron beam, information on the hadron beam is provided by the stack of ionization chambers cells.

The simultaneous acquisition of the charge produced by ionization in the gas gap of each ionization chamber cell allows the measurement of the pristine part of the Bragg peak up to the Bragg peak itself, spread out or not, in one unique measurement.

Each ionization chamber cell integrates the charge collected at the collecting electrode subsequent to gap gas ionization produced by the hadron beam.

The collecting electrode of each detector plate is connected to an acquisition system which acquires the collected charge with a sampling rate that may go down to the millisecond.

The acquisition system can comprise a recycling integrator as a 0.8 μm CMOS (Complementary Metal Oxide Semiconductor) technology chip (also called TERA ASICs chip), such a chip being able to measure simultaneously up to 64 channels, and converting the analogue signal of 64 channels related to 64 collecting electrodes of ionization chamber cells of the present invention.

In the case of 180 ionization chamber cells, as in an example of realization of our invention, 3 or more TERA ASICs chips may be employed.

An advantage of using TERA ASICs chips is that signal conversion occurs without dead time allowing reading the 180 channel deterministically at the very same moment even for a sampling time as short as the order of a millisecond.

Another advantage, with such a high frequency measurement, is that it allows measuring the relative depth dose profile of a spread out Bragg peak and having simultaneously a decomposition of the energy components of the spread out Bragg peak.

The use of TERA ASICs chips in the present device allows also, with its fast capacity of recording, to see the absence of beam whenever the beam energy is changing.

The WET-MLIC is able to measure a hadron beam produced by passive scattering as well as by active scanning with an appropriate choice of the collecting electrodes.

For example, in the case of the measurement of depth dose profile of a beam produced by passive scattering, the collecting electrode must be far enough from the plate borders in order not to collect the ionization produced by ions eventually scattered by such borders. However, the electrode size must be large enough to collect sufficient signal, this being of particular relevance for high depth beam ranges for which the proton current at the exit of the irradiation head is generally only a few nA.

Advantageously, the detector plates (102) have a square shape with an area of at least 200 cm$^2$, for example a 15×15 cm area, the collecting disk shape electrode is located in the centre of symmetry of the said detector plate and the diameter of the said disk shape collecting electrode is comprised between 1 cm and 4 cm, preferably 2 cm and 3 cm, more preferably 2.5 cm.

With such a selected diameter, the measurement of a depth dose profile of a pencil beam is only possible when the device is invested by an irradiation with transversal dimensions in the range of 10 cm, like for example a cylindrical irradiation with a diameter of 10 cm, both produced by double scattering and by active scanning.

In such situation, the electrode samples the ionization produced by the irradiation in the central area of the irradiation volume.

On the other hand, if a measurement of the depth dose profile of a stationary pencil is needed, the dimensions of the electrode need to be chosen according to the maximum pencil beam width at the depth corresponding to the maximum WET of the device, so as to insure the collection of all the beam ionization in all electrodes.

To overcome this problem, it is required for such application, to increase the diameter of detector plate's electrodes in order to detect 100% of the beam on each detector plates of the whole device.

The diameter of detector plate's electrodes can be higher than 2.5 cm, for example comprised between 8 and 12 cm.

Another embodiment of the invention can comprise together with the detector plates as described herein other kinds of detector plates such as detector plates comprising a collecting side comprising a plurality of collecting electrodes (3).

Figure 6:
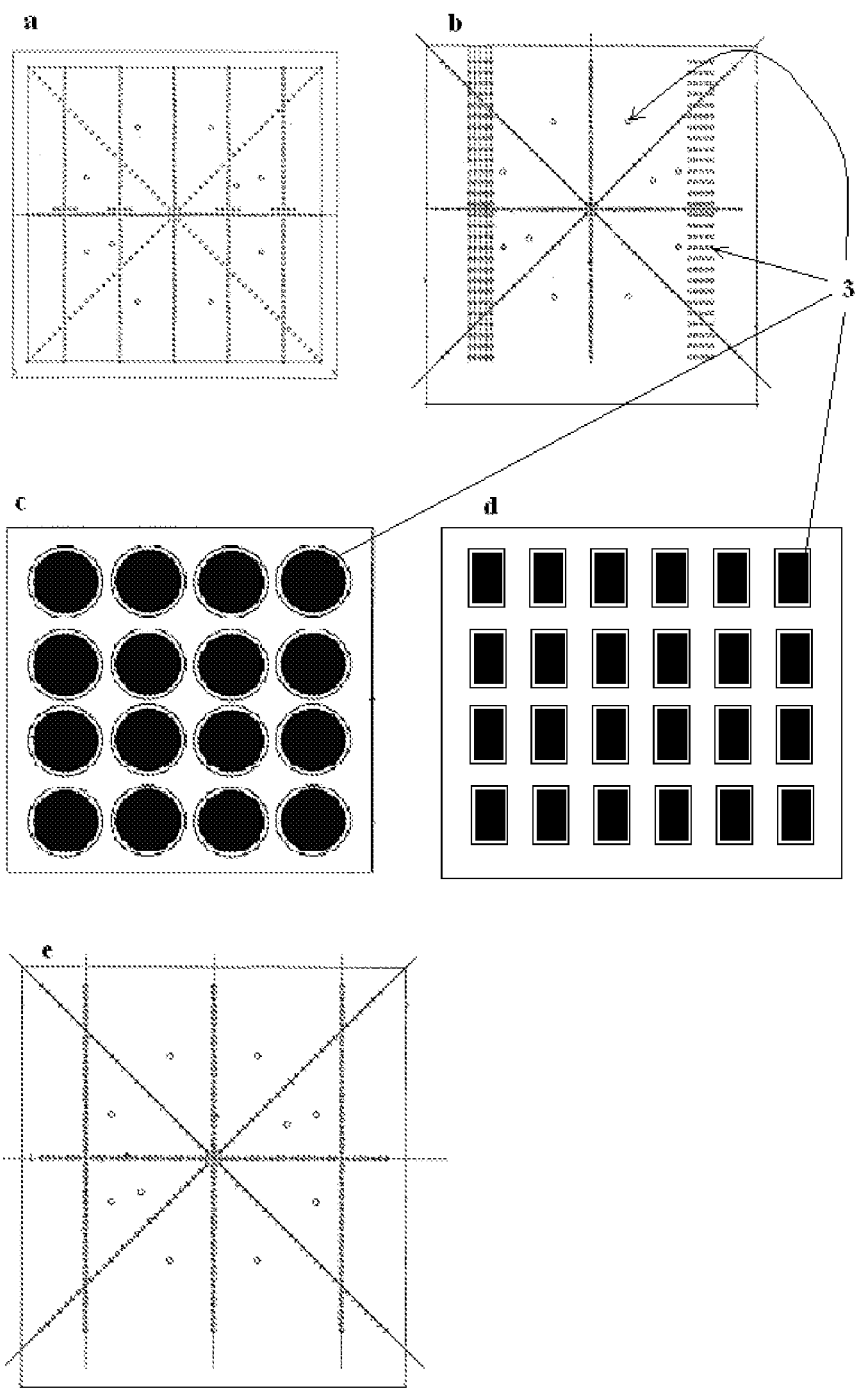
FIGS. 6a, b, c, d, e are different examples of collecting sides of the collecting part of a detector plate comprising a plurality of electrodes.

Examples of first layers of the collecting side of detector plates comprising a plurality of electrodes are represented in FIG. 6. The layouts of electrodes of FIGS. 6a, b, e are designed for assessing the lateral extend of a beam.

The layouts of electrodes of FIG. 6 c and d are designed for obtaining a 2D image of a radiation beam. The organisation of layers in these detector plates is similar than the one described before, each collecting electrode or pixel being connected to the acquisition system by a track.

These kinds of detector plates are made for example by the same PCB technique and are located at various distances in the device in order to have a device measuring both the depth dose profile and the enlargement of a hadron beam.

Typically, the dosimetry device of the present invention is placed on the patient couch in a position wherein the detector plates (102) are perpendicular to the axis of the hadron beam.

Advantageously, the dosimetry device can be irradiated on both sides. According to this preferred execution of the dosimetry device of the invention, two openings are present, one in the front side and one in the back side. This symmetry gives to the user a mean of control of the quality of range measurement. By irradiating the device from both entrances, it is possible to see an eventual difference in the hadron range according to the direction of irradiation when rotating the gantry by 180°. However, the present invention is not that limited. According to an alternative execution, the dosimetry device of the invention may be irradiated exclusively on (from) one side, i.e. either exclusively on the front side or exclusively on the back side of the dosimetry device of the invention.

Preferably, the device may advantageously further comprise a collimator upstream the first plate exposed to the beam. According to the preferred execution whereby the dosimetry device of the invention further comprises a collimator upstream the first plate exposed to the beam, the collimator preferably acts as a means to minimize the irradiation of parts of the device not involved with the direct measurement of the beam. When comprised upstream the first plate exposed to the beam, the collimator is fully part of the dosimetry device according to the invention.

Measurement tests of pristine Bragg peak and spread out Bragg peak have been performed in double scattering and uniform scanning delivery mode.

Measurements in water phantom have been performed for reference and comparison with the WET MLIC.

Figure 7:
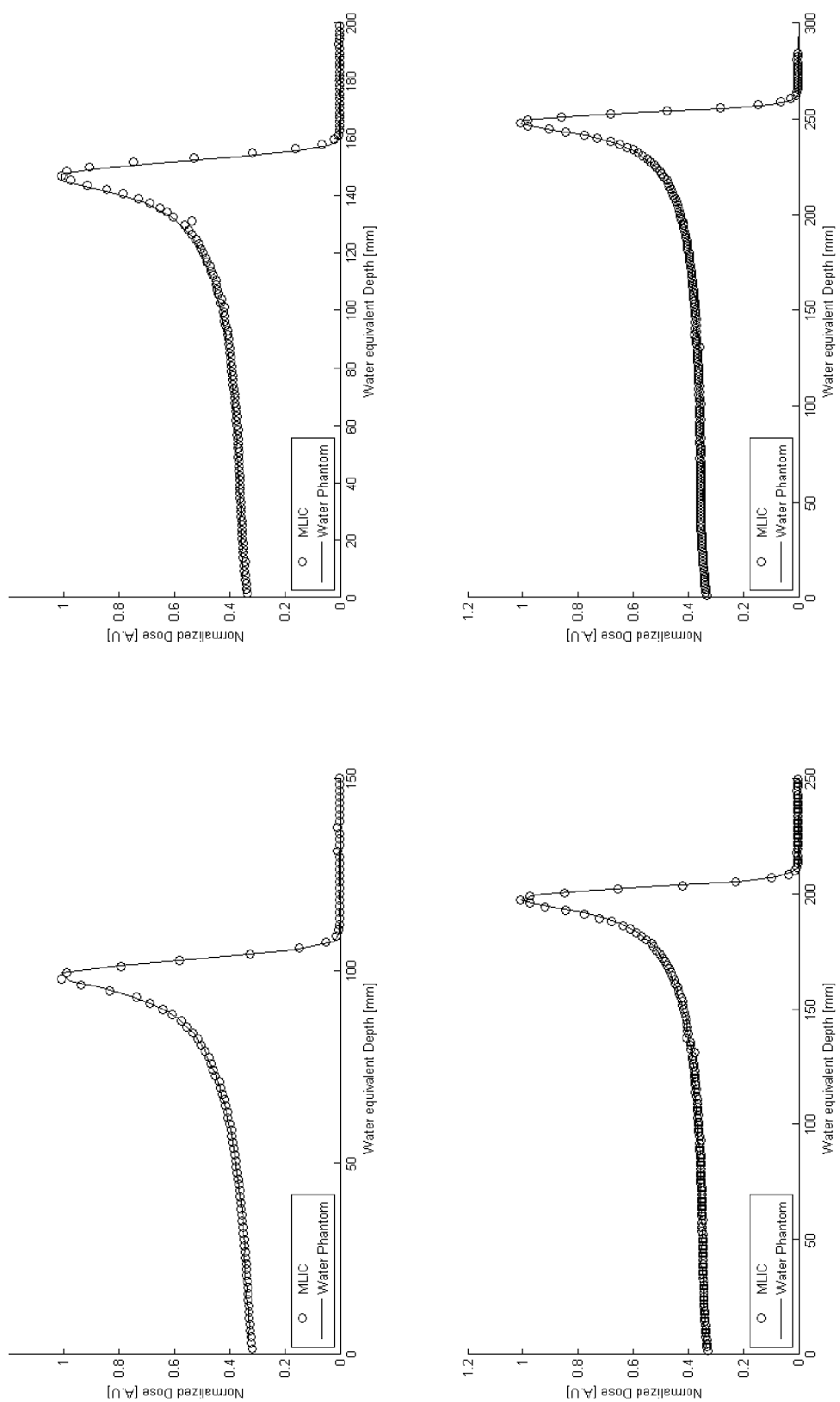
FIG. 7 are different profiles of pristine Bragg peaks obtained by a water phantom (continue lines) and by the present invention (circles).

FIG. 7 shows the experimental data of the measurement of pristine Bragg peak in double scattering at different depth doses. Points on the graph are the raw data obtained by the WET MLIC and continue lines are the ones obtained with a water phantom. As we can see, for all the depth dose profile, results obtained with WET MLIC of present invention are in very good agreement with the referenced method of water phantom. It is overall important to say that only a small and unique correction factor has been introduced to compensate the tolerance between theoretical and effective thickness of the material, giving to this device an appreciable advantage over the prior art.

Figure 8:
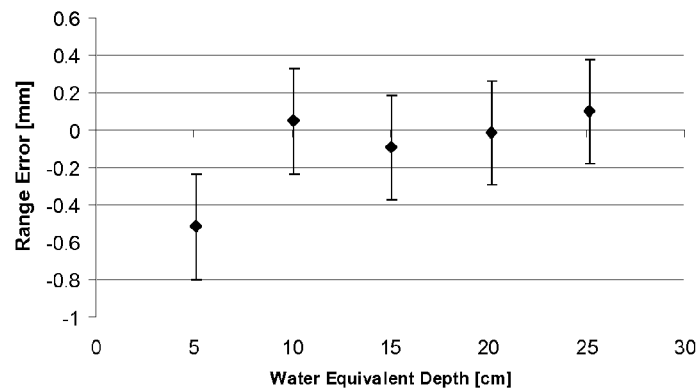
FIG. 8 is a graph showing the computation of the error in the method used in present invention.

The range error has been computed making the difference between both measured 90% distal fall off for WET MLIC and water phantom measurements. Results are presented on FIG. 8, the biggest error being of 0.5 mm on the measure of a 5 cm beam range.

Figure 9:
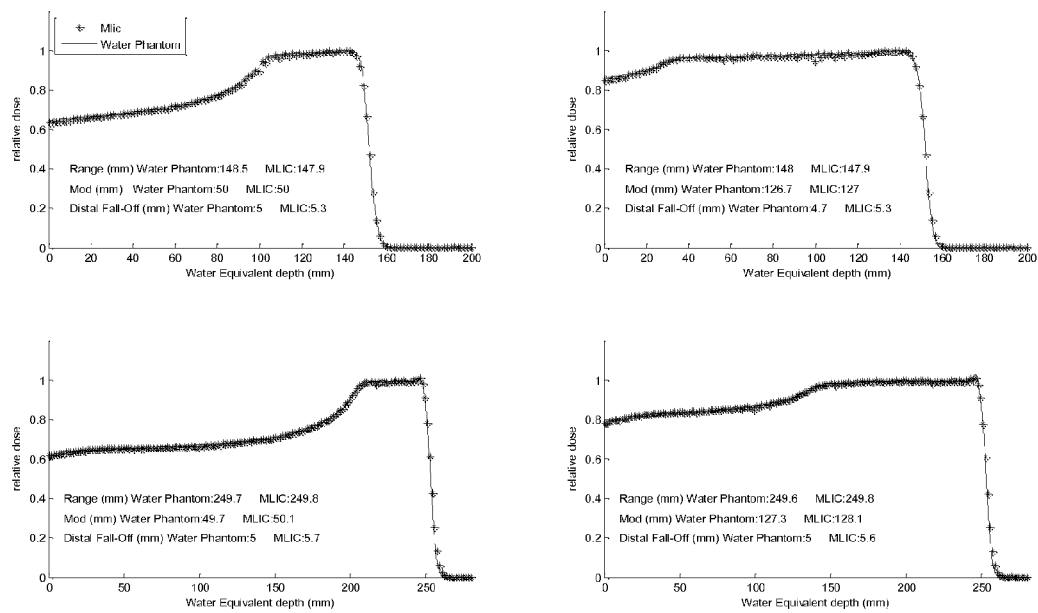
FIG. 9 shows four different profiles of spread out Bragg peaks with various configurations measured by the device of present invention

Experimental measurements of spread out Bragg peak in double scattering with various configurations have been performed. Measurements profiles obtained with MLIC and compared with water phantom measurements are shown in FIG. 9. Experimental data of hadron range, modulation and distal fall-off, obtained by both techniques, are presented on each profile. We obtained an excellent agreement between both techniques for these three parameters: deviations inferior to 0.5 mm for the range, better than 1 mm for the modulation and for the distal fall-off.

Figure 10:
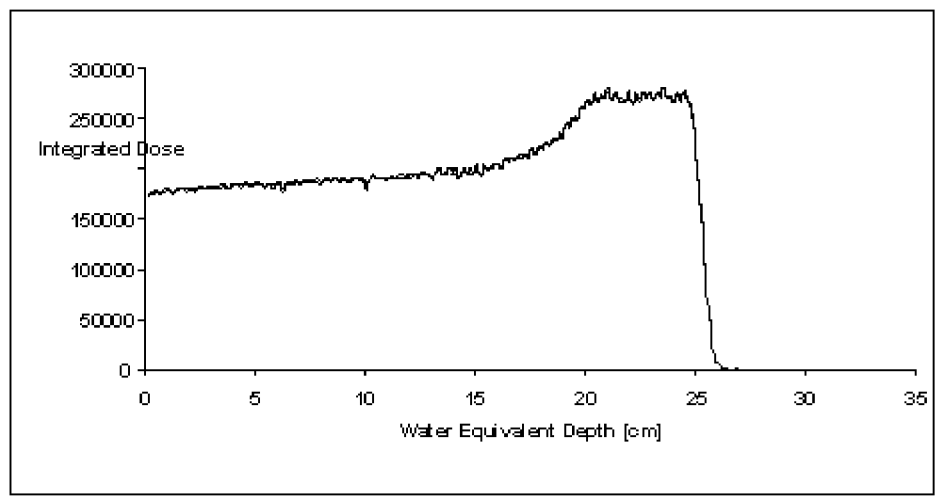
FIG. 10 is a graph showing a superposition of different profiles obtained at different times with present invention.

An evaluation of the stability of the measurement in double scattering with the WET MLIC has been tested on a 25 cm range spread out Bragg peak with 5.7 cm modulation. Depth dose profiles have been taken at different times; all the profiles show the same shape as shown on FIG. 10 wherein three profiles taken at three different times are superposed.

Table 2 shows experimental raw data of the counts for the same measurements performed at least two times in different days. Daily uniformity variations from channel to channel are generally inferior to 0.5% while weekly variation is inferior to 1%.

TABLE 2

| | Counts | Daily average | Daily variation to average | % error on daily average | Weekly average | Weekly variation to average | % error on weekly average |
|---|---|---|---|---|---|---|---|
| Sunday | 276854 | | 1810 | 0.66% | 277255 | | |
| | 274116 | 275044 | −928 | −0.34% | | −2211 | −0.80% |
| | 274163 | | −881 | −0.32% | | | |
| Monday | 279678 | 279632 | 46 | 0.02% | | 2377 | 0.86% |
| | 279587 | | −46 | −0.02% | | | |
| Thuesday | 275480 | | −1609 | −0.58% | | | |
| | 278056 | 277089 | 967 | 0.35% | | −167 | −0.06% |
| | 277730 | | 641 | 0.23% | | | |

The dosimetry device disclosed in present invention encounters the requirements for fast routine quality assurance measurements since a profile of pristine Bragg peak and spread out Bragg peak in both double scattering and uniform scanning can be obtained in one single radiation protocol.

The acquisition time of these quality assurance measurements is considerably reduced with respect to measurements obtained by water phantom based techniques like of prior art with which the measurement time for the relative depth dose profile of a Bragg Peak or SOBP takes a time equal to the irradiation time of one ionization chamber cell multiplied by the number of points needed.

Conversely to prior art devices, the behaviour of the hadron beam in WET MLIC of present invention is from a geometrically and materially point of view equivalent to water and possible corrections due to the difference between $$l_{gi} + \left[\sum_{k=1}^{m} l_k\right]_i \text{ and } \left[\sum_{k=1}^{m} WET_k\right]_i$$

of equation (2) are less necessary, in some cases they can even be omitted.

The device is thus easier to use and measurement time is considerably decreased.

Moreover, the dosimetry devices of prior art can only measure Bragg peak and spread out Bragg peak up to 22 cm while our present invention is able to perform these measurements with high resolution up to 35 cm that corresponds to the generally accepted whole clinical range.

Other requirements encountered by the present invention are the signal quality and stability obtained by the utilized materials, the chosen dimensions and the mechanical stability of the detector plates assembly ensured by four support plates.

Finally, the stack of 180 ionization chamber cells, with chosen dimensions and materials, makes the device lighter and less cumbersome than prior art dosimetry device, the device of present invention being able to be easily transported and positioned on the patient couch for QA before treatment without loss of stability.

The invention claimed is:

1. A device for dosimetry monitoring of a hadron beam, comprising n successive ionization chambers i obtained by a stack of n+1 parallel detector plates separated from each other by a gas filled gap, the detector plates having a collecting part comprising a collecting side insulated from a bias voltage part comprising a bias voltage side and arranged in such a way that the collecting side is facing the bias voltage side of a subsequent detector plate or inversely, the detector plates comprising m layers $L_k$ of materials, the resulting assembly of these detector plates forming a plurality of ionization chamber cells, the thicknesses $I_k$ and the choice of the materials of layer $L_k$ constituting the detector plates as well as the gap of an ionization chamber cell i have been selected in order to satisfy the following equation for the ionization chambers i:

$$I_{gi} + \left[\sum_{k=1}^{m} l_k\right]_i \approx \left[\sum_{k=1}^{m} WET_k\right]_i$$

where $I_{gi}$ is the gas filled gap distance between two detector plates;

$I_k$ is the thickness of the corresponding layer $L_k$ of a detector plate;

$WET_k$ is the water equivalent thickness of the corresponding layer $L_k$ of a detector plate;

and where the difference between $$I_{gi} + \left[\sum_{k=1}^{m} l_k\right]_i \text{ and } \left[\sum_{k=1}^{m} WET_k\right]_i$$

is less than or equal to 5%.

2. The device according to claim 1, wherein the detector plates comprise a stack of m parallel layers, the layers $L_k$ being made essentially of low atomic number Z materials.

3. The device according to claim 1, wherein said collecting part and said bias voltage part of said detector plates are made of a stack of at least three layers, the first layers being external layers being made essentially of graphite, the second layers and third layers being essentially made of an insulator.

4. The device according to claim 3, wherein said collecting part and said bias voltage part of the detector plates comprise fourth layers made of graphite that are respectively adjacent to the third layers.

5. The device according to claim 3, wherein said collecting part and said bias voltage part of the detector plates comprise each at least:

a first layer, comprising one or more electrode regions, an insulating separation surrounding the electrode region and a guard electrode surrounding said insulating separation, a second layer as insulating layer, a third layer comprising at least one conductor track, and;

a fourth layer as guard having at least one insulation path matching with the said conductor tracks of said third layer, the insulation path comprised in the bias voltage side being slightly wider than the said conductor track located in the said third layer of the said bias voltage part, wherein said conductor track of the said third layer of the said collecting part is connected by a via with said collecting electrode and the said conductor track of the said third layer of the said bias voltage part is connected by a via with the bias voltage electrode.

6. The device according to claim 1, wherein said detector plates comprise at least two terminal ears.

7. The device according to claim 1, further comprising an acquisition device comprising at least one recycling integrator.

8. The device according to claim 1, further comprising a collimator upstream the first plate exposed to the beam.

9. A method for monitoring a hadron beam, the method comprising the device as described in claim 1, and positioning the detector plates perpendicularly to the central axis of said hadron beam.

10. The method according to claim 9 for determining the depth dose profile of a spread out Bragg peak comprising the steps of:

(i) directing a hadron beam having a determined energy, (ii) measuring the Bragg peak of said hadron beam, (iii) modifying the energy of said hadron beam, (iv) repeating steps (i) to (iii) and summing said Bragg peaks for directly obtaining said spread out Bragg peak.

11. The method according to claim 10, wherein measurements are performed by irradiating the device from its front side.

12. The method according to claim 10, wherein measurements are performed by irradiating the device from its back side.

13. The method according to claim 10, wherein measurements are performed by irradiating the device by both front and back sides.

14. The method according to claim 9, wherein measurements are performed by irradiating the device by both front and back sides.

* * * * *